US008394190B2

(12) United States Patent
Bertzick et al.

(10) Patent No.: US 8,394,190 B2
(45) Date of Patent: Mar. 12, 2013

(54) CARBON BLACK GRANULATE, METHOD FOR PRODUCING CARBON BLACK GRANULATE, AND USE THEREOF

(75) Inventors: Manfred Bertzick, Bad Münsterifel (DE); Werner Heister, Frechen (DE); Wilfried Ostendorf, Erftstadt (DE); Matthias Katzer, Heusenstamm (DE)

(73) Assignee: Evonik Carbon Black GmbH, Hanau (DE)

( * ) Notice: Subject to any disclaimer, the term of this patent is extended or adjusted under 35 U.S.C. 154(b) by 0 days.

(21) Appl. No.: 13/128,591

(22) PCT Filed: Nov. 10, 2009

(86) PCT No.: PCT/EP2009/064863
§ 371 (c)(1),
(2), (4) Date: Jun. 17, 2011

(87) PCT Pub. No.: WO2010/055018
PCT Pub. Date: May 20, 2010

(65) Prior Publication Data
US 2011/0244384 A1 Oct. 6, 2011

(30) Foreign Application Priority Data

Nov. 11, 2008 (DE) .......................... 10 2008 043 641

(51) Int. Cl.
*C09C 1/58* (2006.01)
(52) U.S. Cl. ....... 106/472; 106/31.9; 106/476; 106/814; 423/449.1; 524/424; 524/495
(58) Field of Classification Search .................. 106/472, 106/476, 31.9, 814; 423/449.1; 524/424, 524/495
See application file for complete search history.

(56) References Cited

U.S. PATENT DOCUMENTS

| 2,422,989 | A | 6/1947 | Skoog |
| 2,828,191 | A | 3/1958 | Glaxner et al. |
| 2,872,336 | A | 2/1959 | Weaver et al. |
| 3,018,171 | A | 1/1962 | Pollock et al. |
| 3,406,426 | A | 10/1968 | Pobst, Jr. et al. |
| 3,607,086 | A | 9/1971 | Dingus |
| 3,787,161 | A | 1/1974 | Frye et al. |
| 4,222,727 | A | 9/1980 | Adachi et al. |
| 4,238,199 | A | 12/1980 | Rothbuhr et al. |
| 4,980,106 | A | 12/1990 | Vogel |
| 5,859,120 | A | 1/1999 | Karl et al. |
| 5,869,550 | A | 2/1999 | Mahmud et al. |
| 6,017,980 | A | 1/2000 | Wang et al. |
| 6,099,818 | A | 8/2000 | Freund et al. |
| 6,150,453 | A | 11/2000 | Mahmud et al. |
| 6,231,624 | B1 | 5/2001 | Vogler et al. |
| 7,112,618 | B2 * | 9/2006 | Otto et al. ...................... 523/161 |
| 7,172,652 | B2 * | 2/2007 | Zoch et al. ..................... 106/476 |
| 2002/0156177 | A1 | 10/2002 | Freund |
| 2004/0219363 | A1 | 11/2004 | Schuch et al. |
| 2007/0203284 | A1 | 8/2007 | Schuch et al. |
| 2008/0219915 | A1 | 9/2008 | Quitmann et al. |
| 2009/0035210 | A1* | 2/2009 | Krauss et al. .............. 423/449.1 |
| 2010/0157296 | A1 | 6/2010 | Stenger et al. |
| 2010/0248120 | A1 | 9/2010 | Riebel et al. |

FOREIGN PATENT DOCUMENTS

| DE | 1262238 B | 3/1968 |
| DE | 1264412 B | 3/1968 |
| DE | 2255637 A1 | 8/1973 |
| DE | 27 03 016 | 7/1978 |
| DE | 195 21 565 A1 | 1/1997 |
| DE | 196 13 796 | 10/1997 |
| DE | 10 2007 025 928 A1 | 12/2008 |
| EP | 0 360 236 A2 | 3/1990 |
| EP | 0 814 133 A1 | 12/1997 |
| EP | 1 464 681 A2 | 10/2004 |
| GB | 847697 | 9/1960 |
| GB | 976603 | 12/1964 |
| GB | 1086985 | 10/1967 |
| GB | 1370704 | 10/1974 |
| GB | 1 598 736 | 9/1981 |
| WO | 98/42778 A1 | 10/1998 |
| WO | 98/45361 A1 | 10/1998 |

OTHER PUBLICATIONS

International Search Report for PCT/EP2009/064863 mailed Feb. 22, 2010 (In English and German language).
Jean Baptiste Donnet, et al., "Carbon Black Science and Technology", Second Edition, Revised and Expanded, Marcel Dekker, Inc. New York 1993 pp. 27-31.
Pietsch, W., "Agglomeration Technologies", Wiley-VCH Verlag GmbH, Weinheim, 2002, pp. 133-227.
Käferstein, P. eta al., Appendix to the final report of the AiF project "Zerfallsverhalten vom Partikeln in Wirbelschichten", Research project No. 11151 B, Magdeburg, 1999, pp. 17-21.

(Continued)

*Primary Examiner* — Anthony J Green
(74) *Attorney, Agent, or Firm* — Smith, Gambrell and Russell, LLP (57) ABSTRACT

The invention relates to carbon black granulates having an APC value, measured at a conveying speed of 8 m/s and a solid load of 27 g/kg, less than or equal to 20 and a 25 [mu]m pressure filter value of less than 5 bar cm2/g. The carbon black granulate is produced by carbon black powder being pre-granulated in a first mixing granulator with addition of a granulation liquid with or without binders and being granulated to a finished state in a second mixing granulator without further addition of granulation liquid. The carbon black granulate can be used as a filler, reinforcing filler, UV stabilizer, conductive carbon black, pigment, or reducing agent.

20 Claims, 2 Drawing Sheets

OTHER PUBLICATIONS

PCT Notification Concerning Transmittal of International Preliminary Report on Patentability (Form PCT/IB/326) for PCT/EP2009/064863 mailed May 26, 2011(in English language).

PCT Notification of Transmittal of Translation of International Preliminary Report on Patentability (Form PCT/IB/338) for PCT/EP2009/064863 mailed May 26, 2011(in English language).

PCT International Preliminary Report on Patentability (Form PCT/IB/373) for PCT/EP2009/064863 issued May 17, 2011 (in English language).

PCT Written Opinion of the International Searching Authority (Form/ISA/237) for PCT/EP2009/064863 issued Feb. 22, 2010 (with English language translation).

DIN EN 13900-1, Jun. 2003.

DIN EN 13900-2, Jun. 2003.

DIN EN 13900-3, Jun. 2003.

DIN EN 13900-5, Jul. 2005.

ASTM International, Designation D1508-02, Standard test Method for Carbon Black, Pelleted Fines and Attrition, reapproved 2007, pp. 1-3.

ASTM International, Designation D1513-05, Standard test Method for Carbon Black, Pour Density, 2010, pp. 1-3.

ASTM International, Designation D1937-05, Standard test Method for Carbon Black, Pelleted-Mass Strength, May 1, 2005, pp. 1-3.

ASTM International, Designation D2414-09a, Standard test Method for Carbon Black, Oil Absorption No. (OAN), Oct. 2009, pp. 1-7.

ASTM International, Designation D5230-09, Standard test Method for Carbon Black, Automated Individual Pellet Hardness, 2010, pp. 1-3.

ASTM International, Designation D6556-09, Standard test Method for Carbon Black, Total and Eternal Surface Area by Nitrogen Adsorption, Mar. 2009, pp. 1-5.

ASTM International, Designation D5816-99, Standard test Method for Carbon Black, External Surface Area by Multipoint Nitrogen Adsorption, Sep. 1999, pp. 1-3.

FprEN 13900-6 as agreed in Vienna Sep. 20, 2011 (clean version), ISO/TC 256/WG 5 N 29, date of document Dec. 14, 2011, pp. 1-13.

\* cited by examiner

CARBON BLACK GRANULATE, METHOD FOR PRODUCING CARBON BLACK GRANULATE, AND USE THEREOF

The invention relates to a granulated carbon black, a process for producing granulated carbon black and its use.

It is known that carbon black is obtained in finely divided powder form in its production. It is usually not only useful but also extremely desirable to convert the carbon black powder into a granulated form in order to improve the handling properties of the product, (Donnet, J.-B. et al. Carbon Black Science and Technology, 2nd Edition, Marcel Dekker, Inc. New York 1993, pp. 27-31). These handling properties include, for example:

- storage properties, for example in a hopper: strength on falling, abrasion resistance, flowability, bridging, consolidation over time, etc.,
- transport properties, for example in a goods vehicle or during pneumatic transport: unloading time, dust pollution, abrasion resistance, flowability, bridging, etc.,
- processability, for example during metering or dispersing: dust pollution, flowability, dispersing times, required dispersing power, quality of dispersion, etc.,
- physical and use properties, for example in the case of pigment blacks for paints and surface coatings: colour strength, colour depth, specks, etc.

A number of processes by means of which carbon black powder can be converted into granulated form under dry or moist conditions are known (Pietsch, W., Agglomeration Processes, Wiley-VCH Verlag GmbH, Weinheim, 2002, pp. 133-227). As is known, two different processes are used industrially for the granulation of carbon black. These are dry granulation in rotating drums (DE 1262238, U.S. Pat. No. 2,422,989, EP 0360236, EP 0814133) and wet granulation in fast-rotating mixing granulators. In the latter process, the pulverulent carbon black is intensively mixed with water, if appropriate with addition of a binder, in the mixing granulator. The moist granules are subsequently dried in a further process step. In general, mixing granulators having a spiked shaft are used. They comprise a horizontal, fixed tube (stator) having a spiked shaft rotating therein. Between the axis of the spiked shaft and the tube wall is the granulation space available for granulation. In the granulation space, the carbon black is conveyed from the inlet at one end of the tube to the outlet at the other end of the tube by the rotating spiked shaft. Granulation is effected by the carbon black rolling down along the stationary tube wall (DE 1264412, U.S. Pat. No. 3,607,086, U.S. Pat. No. 3,787,161, U.S. Pat. No. 4,222,727, EP 1464681).

Dry granulation is limited in its application. In general, it gives readily dispersible products having comparatively poor transport properties. Highly structured furnace blacks in particular require wet granulation in order to obtain granulated carbon blacks of sufficient strength and stability.

As significant improvement in the transport properties has hitherto been able to be achieved only by addition of binders during granulation, but this leads to a significant deterioration in the dispersibility. In addition, addition of binder is frequently not possible since it represents an impurity in the product and is not permitted for numerous applications.

Although a number of wet granulation processes are available, the production of granulated carbon black having excellent handling properties is still unsatisfactory.

For example, U.S. Pat. No. 2,828,191 discloses a process for producing granulated carbon black, in which carbon black powder and water are granulated at a proportion by mass of water of 35-45% in an apparatus having a plurality of pin mixer shafts which are arranged one above the other and rotate at speeds in the range from 300 to 400 rpm. However, at rotational speeds above 400 rpm carbon blacks which are not readily dispersed and are present in insufficiently dispersed form in rubber mixtures are obtained.

U.S. Pat. No. 2,872,336 discloses a process for producing transport-stable granulated carbon black, in which sodium tetraborate is added to the carbon black in a proportion by mass of 0.1-0.7%, based on the dry end product, during granulate formation. The resulting granulated carbon black displays increased total and individual granulate hardness.

Furthermore, DE 2255637 discloses a wet granulating process for producing granulated carbon black, in which the water is added in two stages. In a first step, the carbon black is mixed with 3-75% of the required granulating water at very high shear rates, for instance in a hammer mill or micropulverization apparatus. Here, rotational speeds in the apparatuses of 3500-6500 rpm are chosen. In the second step, the remaining water is finally mixed in. The resulting granulated carbon black has the disadvantage that it has significantly increased strengths.

The known processes allow either the production of comparatively readily dispersible products having poor transfer properties or the production of transport-stable products having a moderate to poor dispersibility.

SUMMARY DISCUSSION

It is an object of the invention to provide a granulated carbon black which at the same time has excellent transport properties and excellent dispersibility.

The invention provides a granulated carbon black which is characterized in that the APC value, measured at a transport velocity of 8 m/s and a solids loading of 27 g/kg, is less than or equal to 20% by weight, preferably less than or equal to 15% by weight, particularly preferably less than or equal to 12% by weight, very particularly preferably less than or equal to 8% by weight, and the 25 µm pressure filter value is less than or equal to 5.0 bar·cm$^2$/g, preferably less than or equal to 2.0 bar·cm$^2$/g, particularly preferably less than or equal to 0.7 bar·cm$^2$/g, very particularly preferably less than or equal to 0.3 bar·cm$^2$/g.

The APC value characterizes the abrasion and fracture behaviour of granulated carbon black during pneumatic pressure transport. The particle size distributions of granulated carbon black are determined before and after transport over a test section. The increase in the proportion of dust in granulated carbon black during pneumatic transport enable conclusions regarding the transport behaviour of the granulated carbon black granules used to be drawn. The APC value is determined using a pneumatic transport test apparatus [Käferstein P., Mörl L., Dalichau J., Behns W., Appendix to the final report of the AiF project "Zerfallsverhalten von Partikeln in Wirbelschichten", Research project No. 11151 B, Magdeburg, 1999, pp. 17- 21], with the sample of granulated material being, as a deviation from this method, introduced via a Venturi injector. The pneumatic pressure transport test apparatus used is described in DE 102007025928.1 (which is a family member of US Publication No. 2010/0157296). The pneumatic pressure transport test apparatus consists essentially of two feed chutes,
an air flow regulating valve,
a Venturi injector,
a transport section ("loop +bend"),
a laser light scattering measuring instrument,
an exhaust air box and
a noise protection box.

Figure 1:
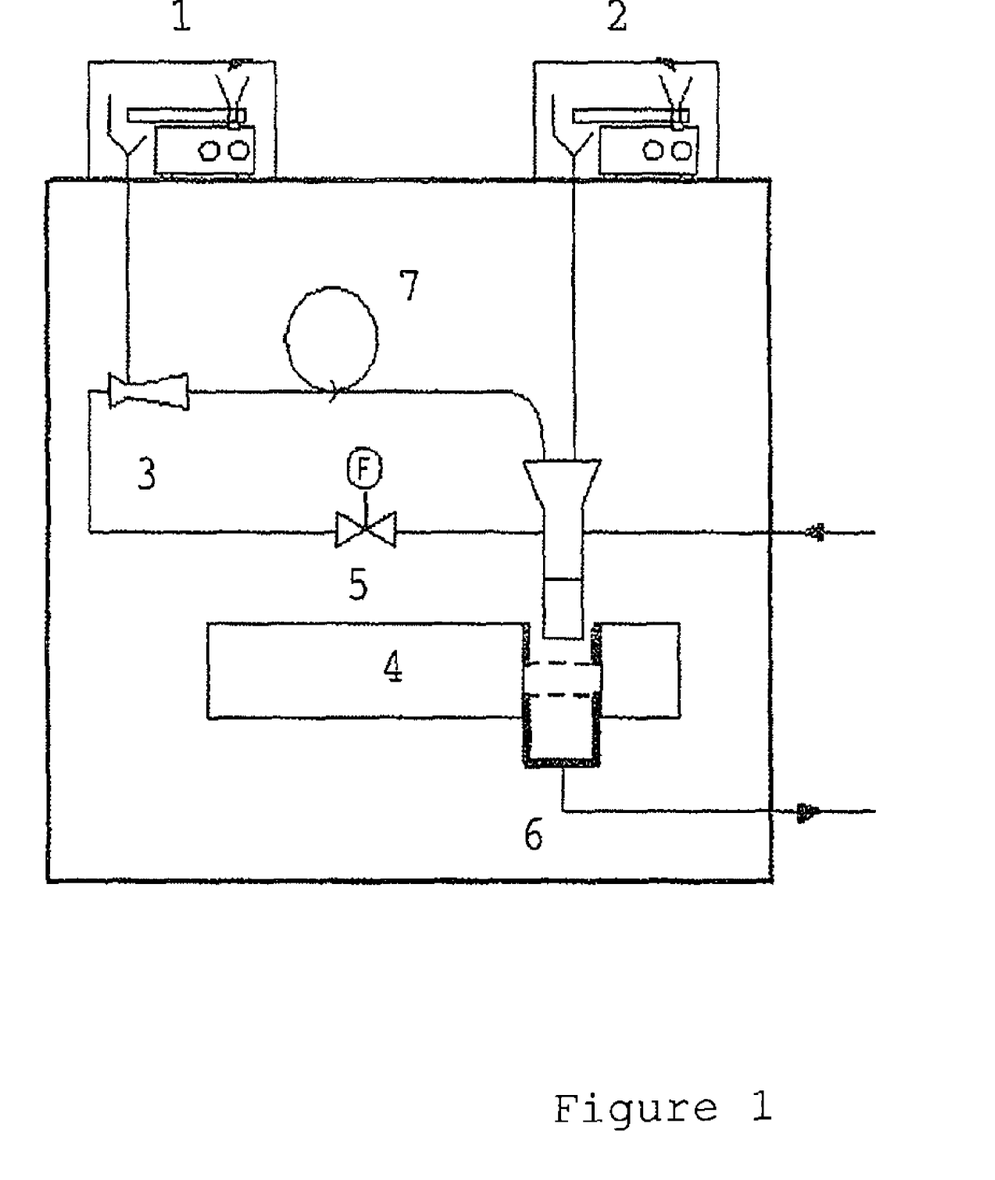
FIG. 1 shows a sketch of a pneumatic pressure transport test apparatus.

FIG. 1 shows the structure of a transport apparatus:
1 vibrating chute stressing section,
2 vibrating chute reference measurement,
3 Venturi injector,
4 laser light scattering spectrometer,
5 air flow regulating valve,
6 exhaust air box,
7 stressing section.

The noise protection box has the dimensions 1.9*1.3*1.0 m (L/H/W). The stainless steel pipes have an internal diameter of 44 mm. The loop has a circumference of 1.5 m. The bend has a length of 0.5 m. The air and the transport pressure required are derived from a compressed air supply network (6 bar). The air flow or the air velocity is set via the air flow regulating valve, with the apparatus being designed for a maximum air flow of 180 m$^3$/h. The air velocity is set to 8 m/s, based on the pipe cross section of 44 mm. The granulated carbon blacks are fed into the downcomer tube by means of a vibrating chute. The vibrating chute and the opening of the downcomer tube are enclosed for the purposes of acoustic insulation. To fill the hopper, a transparent plastic lid can be opened. The feed rate at the vibrating chute is selected so that a solids loading of 27 g/kg of air is obtained. To introduce the carbon black into the transport section, a Venturi injector is required. The injector has a diameter at the constriction of 22 mm and an acceleration distance of 50 mm (distance from the introduction of the granulated carbon black via a hopper to the end of the diffusor). The injector is followed by the transport section (loop+bend) in which the granulated carbon blacks are subjected to stress. The carbon black subsequently goes via a hopper into the widened laser beam of the laser light scattering measuring instrument. The particle size distribution is recorded. The air/particle stream goes via the exhaust air box into the extraction line and thus into the extraction system of the building. The second vibrating chute is available for a reference measurement without stressing of the granulated carbon black. Here, the corresponding downcomer tube leads directly into the hopper and to the measurement zone of the laser light scattering and subsequently likewise into the extraction line. The APC value is the difference between the proportion of particles having a size of <125 μm in % by weight after pneumatic transport of the granulated carbon blacks and the proportion of particles having a size of <125 μm in % by weight in the unstressed granulated carbon blacks (without pneumatic transport).

The 25 μm pressure filter value is determined by a method based on DIN EN 13900-5 using a 25 μm sieve of the 4-layer filter disc type with finest layer=square 25 μm openings from GKD-Gebr. Kufferath.

The granulated carbon black can be a furnace black, flame black, thermal black, channel black, gas black, plasma black, electric arc black, acetylene black, inversion black, known from DE 19521565, Si-containing carbon black, known from WO 98/45361 or DE 196113796, metal-containing carbon black, known from WO 98/42778, or heavy metal-containing carbon black as is obtained, for example, as by-product in the production of synthesis gas.

The granulated carbon black can have a specific surface area, measured by the Brunauer, Emmett and Teller method (BET in accordance with ASTM 6556-01a) using nitrogen adsorption, of 10-1200 m$^2$/g, preferably 15-600 m$^2$/g, particularly preferably 18-400 m$^2$/g, very particularly preferably 40-300 m$^2$/g.

The granulated carbon black can have a specific surface area, measured by the STSA method (ASTM D-5816-99), of 15-400 m$^2$/g, preferably 20-300 m$^2$/g, particularly preferably 50-250 m$^2$/g.

The granulated carbon black can have an oil absorption number (OAN in accordance with ASTM D-2414-01 using Marcol 82 paraffin oil) of 20-200 ml/100 g, preferably 30-160 ml/100 g, particularly preferably 40-140 ml/100 g, very particularly preferably 80-135 ml/100 g.

The granulated carbon black can have an individual granulate hardness, measured on the size fraction 0.5-0.71 mm, of 0.1-8.0 g, preferably 1.0-6.0 g, particularly preferably 1.5-3.5 g. The individual granulate hardness is measured by a method based on ASTM 5230, with the difference that granules of the size fraction 0.5-0.71 mm are measured using a manually operatable measuring apparatus GFP (manual) from ETEWE GmbH in Karlsruhe.

The granulated carbon black can have a 5 min fines content (ASTM D-1508-01) of less than 20% by weight, preferably less than 5% by weight, particularly preferably less than 2% by weight, very particularly preferably less than 1% by weight.

The granulated carbon black can have an 18 min abrasion of less than 10% by weight, preferably less than 5% by weight, particularly preferably less than 2% by weight, very particularly preferably less than 1% by weight. The 18 min abrasion is measured by a method based on ASTM D 1508, with the difference that the <125 μm fines fraction is separated off after a sieving time of 2 min instead of 5 min, and the retained sample is subsequently stressed in the sieve for a further 18 min instead of 15 min.

The granulated carbon black can have a bulk density (ASTM D 1513-05) of 100-800 g/l, preferably 200-650 g/l, particularly preferably 300-500 g/l, very particularly preferably 340-430 g/l.

The granulated carbon black can have an average granulate size Q3:50% of 150-1500 μm, preferably 250-900 μm, particularly preferably 400-750 μm, very particularly preferably 450-700 μm. The average granulate size Q3:50% is determined from the granulate size distribution. The volumetric cumulative distribution Q3 is determined using a commercial CAMSIZER instrument from Retsch GmbH in Haan, equipped with an area light source and two CCD cameras for recording the image and having a feed chute DR 100-45 and a hopper for introducing products. The granulate sizes with the cumulative distribution values 10% (=Q3:10%), 50% (Q3:50%) and 90% (=Q3:90%) are employed as characteristic parameters.

The granulated carbon black can have an NSP value of less than 100% by weight, preferably less than 50% by weight, particularly preferably less than 35% by weight, very particularly preferably less than 25% by weight. The NSP value is the proportion of nonspherical granules. The NSP value is determined using a commercial CAMSIZER instrument from Retsch GmbH in Haan. This calculates the sphericity (square of projected area:circumference) of each granulate measured optically. The NSP value characterizes the percentage of granules (by number) whose sphericity is less than 0.9 (sphere=1).

The granulated carbon black can have a 5 μm pressure filter value of less than 100 bar cm$^2$/g, preferably less than 50 bar cm²/g, particularly preferably less than 20 bar cm²/g, very particularly preferably less than 10 bar cm²/g. The 5 μm pressure filter test is carried out by a method based on DIN EN 13900-5 using a 5 μm Porostar sieve from Haver & Boeker.

The granulated carbon black can have a total defect area in the flat film test of less than 500 ppm, preferably less than 100 ppm, particularly preferably less than 50 ppm, very particularly preferably less than 30 ppm. The total defect area is determined in a flat film test. The flat film test has the aim of obtaining quantitative information on the carbon black distribution and redilution properties of carbon black/polymer concentrates. It is carried out by a method based on the draft standard DIN EN 13900-6 using an automatic film quality analysis system from OCS (Optical Control Systems) in Witten. The quantitative evaluation is carried out by means of electronic image analysis (winfs5 software from OCS) in transmitted light. For this purpose, the carbon black/polymer concentrates to be tested are diluted with a suitable test polymer to a carbon black concentration of 1% by means of a single-screw extruder and processed to produce flat films. The flat films produced are evaluated quantitatively on-line by means of electronic image analysis in transmitted light.

In this test, 7.5 m² films are evaluated in each experiment. The reduction in the light transmission caused by carbon black agglomerates and contaminants is utilized by the camera system to detect these as defects. To assess the film quality, defects above an area corresponding to the size of a circular cross section of 50 μm are determined and classified in 10 size classes. In addition, the total defect area of the film is calculated in ppm. The threshold value in the microscopic evaluation and the film analysis system is set to level 35. The threshold value of level 35 means that defects are only recognized as such when the light transmission is reduced below 35% of the previous value. Since the light transmission values of the film are subject to some fluctuations in width and length, the absolute threshold value is continually recalculated. The grey value, which regulates the illumination time of the film, is automatically adjusted. If the film becomes too dark during the measurement and the grey value set cannot be restored, the measurement is automatically ended. In the case of doubt, the measurement should then be repeated. The grey value is given a value of 170.

The granulated carbon black can have a dispersion hardness (DIN EN 13900-2) of less than 200, preferably less than 50, particularly preferably less than 30, very particularly preferably less than 20.

The granulated carbon black can be binder-free or binder-containing.

The invention further provides a process for producing granulated carbon black, which is characterized in that carbon black powder is pregranulated at a constant feed rate in a first mixing granulator with addition of a granulating liquid and granulated to completion in a second mixing granulator without further addition of granulating liquid.

The first mixing granulator can preferably rotate at a high speed. The rotor speed can be 300-1000 rpm, preferably 450-900 rpm, particularly preferably 600-800 rpm.

The second mixing granulator can preferably rotate at a high speed. The rotor speed can be 300-1000 rpm, preferably 450-900 rpm, particularly preferably 600-800 rpm.

The carbon black powder can be fed in at the inlet of the first mixing granulator by means of a mass or volume metering device. For this purpose, it is possible to use star feeders, screws, mass flow metering balances, metering screws, rotary metering balances, etc. The mass flow can be measured by means of an impingement plate system. The throughput of carbon black through the mixing granulator can therefore be equal to the feed rate of the metering device and can thus be set within wide limits.

The carbon black powder can be a furnace black, flame black, thermal black, channel black, gas black, plasma black, electric arc black, acetylene black, inversion black, known from DE 19521565, Si-containing carbon black, known from WO 98/45361 or DE 196113796, metal-containing carbon black, known from WO 98/42778, or heavy metal-containing carbon black as is obtained, for example, as by-product in the production of synthesis gas.

The carbon black powder can have a specific surface area, measured by the Brunauer, Emmett and Teller method (BET) using nitrogen adsorption, of 10-1200 m²/g, preferably 15-600 m²/g, particularly preferably 18-400 m²/g, very particularly preferably 40-300 m²/g.

The carbon black powder can have a specific surface area, measured by the STSA method, of 15-400 m²/g, preferably 20-300 m²/g, particularly preferably 50-250 m²/g.

The carbon black powder can have an oil absorption number (OAN value) of 20-200 ml/100 g, preferably 30-160 ml/100 g, particularly preferably 40-140 ml/100 g, very particularly preferably 80-135 ml/100 g.

The granulating liquid can be introduced very close to the inlet of the first mixing granulator. It can be introduced at a pressure of from 3 to 7 bar via a plurality of spray nozzles which can be mounted on a plurality of spray nozzle holders.

As granulating liquid, it is possible to use water or hydrocarbons, for example petroleum spirit or cyclohexane, with or without addition of binders, for example molasses, sugar, lignosulphonates and also numerous other materials either alone or in combination with one another.

The granulated carbon black from the mixing granulator can subsequently be dried. The dryer temperature can be in the range from 100° to 300° C., preferably from 140° to 200° C.

The temperature of the granulated carbon black at the outlet of the dryer can be in the range from 30° to 140° C., preferably from 40° to 70° C.

The stator of the mixing granulator can be heated to a temperature in the range from 20 to 150° C., preferably from 80 to 120° C., during granulation in order to largely prevent sticking of the carbon black to the wall of the stator.

The residence time of the carbon black in the fast-rotating mixing granulators connected in series, which is given by the quotient (granulating volume of the mixing granulator)/(volume flow of carbon black powder), can be 50-500 sec, preferably 100-350 sec, particularly preferably 150-250 sec.

Degree of fill and residence time can be increased by raising the outlet compared to the inlet. The resulting angle between the axis of the granulator and the horizontal can be changed between 0 and 15°.

The temperature of the carbon black in the mixing granulators can be 10-100° C., preferably 30-90° C., particularly preferably 50-80° C.

The maximum circumferential velocity of the mixing tools in the fast-rotating mixing granulators can be 10-50 m/s, preferably 12-30 m/s, particularly preferably 15-25 m/s.

As fast-rotating mixing granulators, it is possible to use annular layer mixing granulators, for example from Ruberg-Mischtechnik or Lödige in Paderborn, or other continuous mixing granulators equipped with a pin shaft or spiked shaft or other mixing tools which are mounted on the fast-rotating mixer shaft, for example pins, paddles or blades.

The spikes can be arranged in three helices around the spiked shaft. The distance between the spikes and the wall can be from 4 mm to 15 mm, preferably from 4 mm to 6 mm.

The first mixing granulator can be an annular layer mixing granulator as is known from EP 1464681.

The second mixing granulator can likewise be an annular layer mixing granulator as is known from EP 1464681, with the difference that facilities for the addition of granulating liquid are not necessary.

The process of the invention can be carried out using two annular layer mixing granulators which are equipped with spiked shafts and are connected in series. The structure of such a series arrangement (AMP 1 (A) and AMP 2 (B)) and of such an annular layer mixing granulator are shown schematically in FIG. 2.

Figure 2:
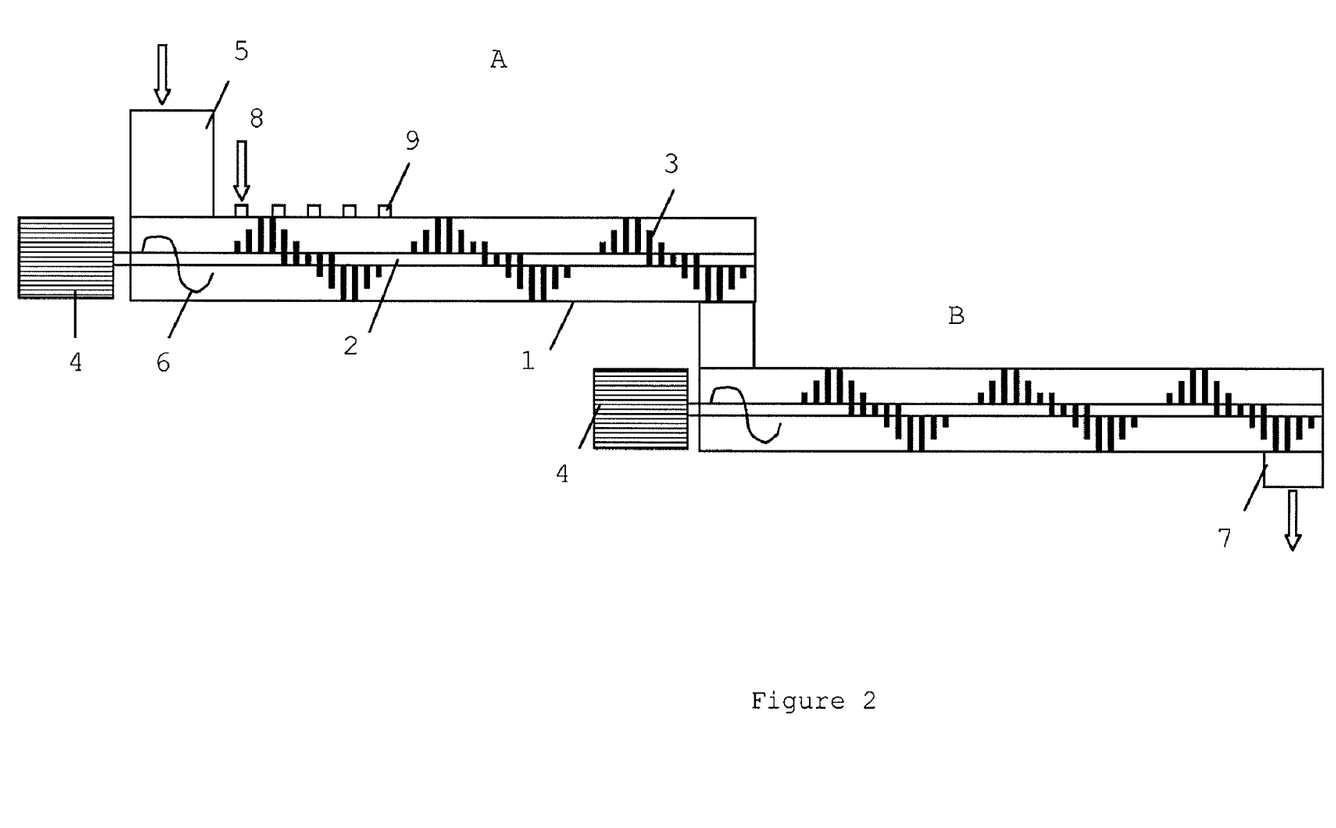
FIG. 2 shows, schematically, an annular layer mixing granulator series arrangement.

The granulator can in each case comprise a horizontal fixed tube or barrel 1, viz. the stator, and a rotating spiked shaft 2 which is arranged axially therein and has helically arranged spikes 3. The spiked shaft is driven by a drive motor 4. Between the spiked shaft 2 and the stator 1 is the granulation space of the granulator. The carbon black powder can be fed into the annular layer mixing granulator at the inlet 5. A feed screw 6 can be present on the spiked shaft in the region of the inlet in order to convey the carbon black in the axial direction to the outlet 7. The stator 1 can have a double-walled construction so as to allow the stator wall to be heated by means of a liquid 8. Holes 9 can be present along the stator to allow the spray nozzles for introduction of the granulating liquid to be inserted.

The granulated carbon blacks of the invention can be used as filler, reinforcing filler, UV stabilizer, conductive carbon black or pigment. The carbon blacks of the invention can be used in rubber, plastic, printing inks, inks, inkjet inks, toners, surface coatings, paints, paper, bitumen, concrete and other building materials. The carbon blacks of the invention can be employed as reducing agent in metallurgy.

The granulated carbon blacks of the invention have the advantage that they are very stable on transport and at the same time are readily dispersible.

The process of the invention has the advantage that very high throughputs can be achieved.

EXAMPLES

The carbon black powders used in Examples 1 to 8 are produced as described in DE 19521565.

The carbon black powders used in Examples 9 and 10 are produced as described in US 2002/0156177.

Production of the Granulated Carbon Blacks—Comparative Examples

The comparative carbon blacks are produced in a spiked shaft annular layer mixing granulator (RMG 800 from Ruberg Mischtechnik KG) having a barrel length of 1950 mm and an internal diameter of the barrel of 620 mm. The shaft diameter is 150 mm. The spikes are arranged in three helices around the spiked shaft and have a diameter of 15-16 mm. The distance between the spikes and the wall is from 4 to 10 mm. The granulator is heated by water at 95° C. The granulating liquid is fed in via two nozzle holders which each have two spray nozzles at a granulating liquid pressure at the spray nozzles of a constant 3.5 bar. The spray direction of the nozzles has an angle of 45° to and in the direction of flow of the carbon black. The spray nozzles are positioned very close to the carbon black inlet in the RMG 800 in order to obtain optimal granulating action over the remaining length of the RMG 800. As binder, sodium lignosulphonate is added in a concentration of 0-2000 ppm to the granulating liquid. The carbon black granules are subsequently dried at 180° C. in a drum dryer.

Production of the Granulated Carbon Blacks—Examples According to the Invention

Various carbon black grades according to the invention are granulated using two annular layer mixing granulators connected in series as shown in FIG. 2. The first annular layer mixing granulator (RMG 800 from Ruberg Mischtechnik KG) has a barrel length of 1950 mm and an internal diameter of 620 mm. The shaft diameter is 150 mm. The second annular layer mixing granulator (RMG 600 from Ruberg Mischtechnik KG) has a barrel length of 2180 mm and an internal diameter of the barrel of 515 mm. The shaft diameter is 290 mm. The spikes in the two annular layer mixing granulators are arranged in three helices around the spiked shaft and have a diameter of 15-16 mm. The distance between the spikes and the wall is from 4 to 10 mm. The granulator is heated by means of water at 95° C. On the first annular layer mixing granulator, the granulating liquid is fed in via two nozzle holders each provided with two spray nozzles at a granulating liquid pressure at the spray nozzles of a constant 3.5 bar. The spray direction of the nozzles has an angle of 45° to and in the direction of flow of the carbon black. The spray nozzles are positioned very close to the carbon black inlet in the RMG 800 in order to obtain optimal granulating action over the remaining length of the RMG 800. As binder, sodium lignosulphonate is added in a concentration of 0-2000 ppm to the granulating liquid. The carbon black granules are subsequently dried at 180° C. in a drum dryer.

The comparative carbon blacks and granulated carbon blacks according to the invention are produced using the process parameters indicated in Table 1.

The analytical and use properties of the dried granulated carbon blacks are shown in Tables 2a and 2b.

TABLE 1

| Starting carbon black and process parameters | Comparative granulated material Example 1 | Comparative granulated material Example 2 | Comparative granulated material Example 3 | Granulated carbon black according to the invention Example 4 | Granulated carbon black according to the invention Example 5 | Granulated carbon black according to the invention Example 6 | Granulated carbon black according to the invention Example 7 | Granulated carbon black according to the invention Example 8 | Granulated carbon black according to the invention Example 9 | Granulated carbon black according to the invention Example 10 |
|---|---|---|---|---|---|---|---|---|---|---|
| Carbon black powder BET [m$^2$/g] | 126 | 102 | 75 | 126 | 126 | 126 | 102 | 75 | 19 | 19 |
| Carbon black powder | 85 | 82 | 74 | 85 | 85 | 85 | 82 | 74 | 18 | 19 |

TABLE 1-continued

| Starting carbon black and process parameters | Comparative granulated material Example 1 | Comparative granulated material Example 2 | Comparative granulated material Example 3 | Granulated carbon black according to the invention Example 4 | Granulated carbon black according to the invention Example 5 | Granulated carbon black according to the invention Example 6 | Granulated carbon black according to the invention Example 7 | Granulated carbon black according to the invention Example 8 | Granulated carbon black according to the invention Example 9 | Granulated carbon black according to the invention Example 10 |
|---|---|---|---|---|---|---|---|---|---|---|
| STSA [m²/g] Carbon black powder | 115 | 98 | 101 | 115 | 115 | 115 | 98 | 101 | 80 | 135 |
| OAN [m²/g] | 1530 | 1680 | 1760 | 1530 | 1530 | 1790 | 1680 | 1760 | 1620 | 1710 |
| Mass flow of carbon black [kg/h] | 680 | 600 | 620 | 600 | 750 | 750 | 750 | 750 | 750 | 750 |
| Rotational speed of AMP 1 [min⁻¹] | 93 | 80 | 83 | 49 | 51 | 52 | 53 | 52 | 51 | 53 |
| Current drawn by AMP 1 [A] | — | — | — | 600 | 700 | 700 | 700 | 700 | 700 | 700 |
| Rotational speed of AMP 2 [min⁻¹] | — | — | — | 53 | 50-60 | 55-65 | 55-65 | 55-65 | 54-63 | 55-64 |
| Current drawn by AMP 2 [A] | | | | | | | | | | |
| Dryer temperature [° C.] | 180 | 180 | 180 | 180 | 180 | 180 | 180 | 180 | 180 | 180 |

TABLE 2a

| Analysis | Comparative granulated material Example 1 | Comparative granulated material Example 2 | Comparative granulated material Example 3 | Granulated carbon black according to the invention Example 4 | Granulated carbon black according to the invention Example 5 | Granulated carbon black according to the invention Example 6 | Granulated carbon black according to the invention Example 7 | Granulated carbon black according to the invention Example 8 | Granulated carbon black according to the invention Example 9 | Granulated carbon black according to the invention Example 10 |
|---|---|---|---|---|---|---|---|---|---|---|
| APC value [% by weight] | 26 | 30 | 21 | 16 | 12 | 13 | 14 | 6 | 8 | 8 |
| Pressure filter value, 25 µm [bar cm²/g] | 0.2 | 0.3 | 0.2 | 0.2 | 0.2 | 0.1 | 0.2 | 0.1 | 0.3 | 1.9 |
| Pressure filter value, 5 µm [bar cm²/g] | 34 | 5 | 9 | 30 | 19 | 28 | 2 | 4 | 35 | |
| Individual granulate hardness [g] | 2.5 | 2.5 | 2.9 | 2.5 | 2.3 | 2.4 | 2.3 | 2.8 | 6.5 | 7.0 |
| Dispersion hardness [—] | 14 | 22 | 30 | 20 | 19 | 19 | 18 | 27 | 20 | 14 |
| Flat film test: total defect area [ppm] | 39 | 15 | 28 | 35 | 33 | 29 | 15 | 26 | 10 | 15 |

TABLE 2b

| Analysis | Comparative granulated material Example 1 | Comparative granulated material Example 2 | Comparative granulated material Example 3 | Granulated carbon black according to the invention Example 4 | Granulated carbon black according to the invention Example 5 | Granulated carbon black according to the invention Example 6 | Granulated carbon black according to the invention Example 7 | Granulated carbon black according to the invention Example 8 | Granulated carbon black according to the invention Example 9 | Granulated carbon black according to the invention Example 10 |
|---|---|---|---|---|---|---|---|---|---|---|
| Fines content, 2 min [%] | 1.5 | 1.8 | 1.6 | 1.0 | 0.4 | 0.6 | 0.5 | 0.4 | — | — |
| Fines content, 5 min [%] | 4.4 | — | — | — | 0.8 | 0.9 | — | — | — | — |
| Fines content, 10 min [%] | 6.8 | — | — | — | 1.0 | 1.2 | 1.0 | 0.7 | 1.8 | 2.0 |
| Abrasion, 18 min [%] | 8.4 | 5.2 | 3.2 | 2.0 | 1.5 | 1.9 | 1.0 | 0.9 | 1.0 | 1.3 |
| Bulk density [g/l] | 336 | 370 | 380 | 352 | 354 | 372 | 380 | 408 | 400 | 345 |
| Average granulate diameter Q3: 50% [μm] | 735 | 920 | 790 | 650 | 500 | 500 | 470 | 590 | 600 | 550 |
| Q3: 90% [μm] | 1160 | 1530 | 1430 | 1300 | 1050 | 994 | 810 | 1280 | 1210 | 1170 |
| Q3: 10% [μm] | 230 | 420 | 290 | 280 | 270 | 284 | 270 | 250 | 230 | 210 |
| NSP value [%] | 41 | 28 | 29 | 23 | 18 | 17 | 21 | 21 | 18 | 21 |

Methods of Determination:

The analytical and use data for the granulated carbon blacks are determined in accordance with the following standards or by a method based on the following standards:
BET surface area: in accordance with ASTM 6556-01a.
STSA surface area: in accordance with ASTM D-5816-99.
Oil absorption number: in accordance with ASTM D-2414-01. The paraffin oil Marcol 82 from Exxon is used for determining the oil absorption number.
Individual granulate hardness: by a method based on ASTM 5230, with the difference that granules of the size fraction 0.5-0.71 mm are measured using a manually operatable measuring apparatus GFP (manual) from ETEWE GmbH in Karlsruhe.
Fines content <125 μm: by a method based on ASTM D-1508-01 with the difference that, in addition to the fines content after a sieving time of 5 min, the fines content is also determined after a sieving time of 2 min and 10 min.
Abrasion, 18 min: by a method based on ASTM D 1508, with the difference that the <125 μm fraction is separated off after a sieving time of 2 min instead of 5 min and the retained sample is subsequently stressed in the sieve for a further 18 min instead of 15 min.
APC value: the APC value characterizes the abrasion and fracture behaviour of granulated carbon black during pneumatic pressure transport. The particle size distributions of granulated carbon black are determined before and after transport over a test distance. The increase in the proportion of dust of granulated carbon black during pneumatic transport enables conclusions regarding the transport behaviour of the types of granulated carbon black used to be drawn.

The APC value is determined using a pneumatic transport test apparatus [Käferstein P., Mörl L., Dalichau J., Behns W., Appendix to the final report of the AiF project "Zerfallsverhalten von Partikeln in Wirbelschichten", Research project No. 11151 B, Magdeburg, 1999, pp. 17-21], with, as a difference from this, the sample of granulated material being introduced via a Venturi injector. The pneumatic pressure transport test apparatus used is described in DE 102007025928.1. The pneumatic pressure transport test apparatus consists essentially of two feed chutes,
an air flow regulating valve,
a Venturi injector,
a transport section ("loop+bend"),
a laser light scattering measuring instrument,
an exhaust air box and
a noise protection box.

A sketch of the pneumatic pressure transport test apparatus used is shown in FIG. 1.

The noise protection box has the dimensions 1.9*1.3*1.0 m (L/H/W). The stainless steel pipes have an internal diameter of 44 mm. The loop has a circumference of 1.5 m. The bend has a length of 0.5 m.

The air and the transport pressure required are derived from a compressed air supply network (6 bar). The air flow or the air velocity is set via the air flow regulating valve, with the apparatus being designed for a maximum air flow of 180 m³/h. In the experiments, an air velocity of 8 m/s, based on the tube cross section of 44 mm, is set.

The granulated carbon blacks are fed into the downcomer tube by means of a vibrating chute. The vibrating chute and the opening of the downcomer tube are enclosed for the purposes of acoustic insulation. To fill the hopper, a transparent plastic lid can be opened. In the present experiments, the feed rate at the vibrating chute is selected so that a solids loading of 27 g/kg of air is obtained.

To introduce the carbon black into the transport section, a Venturi injector is required. The injector has a diameter at the constriction of 22 mm and an acceleration distance of 50 mm (distance from the introduction of the granulated carbon black via a hopper to the end of the diffusor).

The injector is followed by the transport section (loop+bend) in which the granulated carbon blacks are subjected to stress. The carbon black subsequently goes via a hopper into the widened laser beam of the laser light scattering measuring instrument. The particle size distribution is recorded. The air/particle stream goes via the exhaust air box into the extraction line and thus into the extraction system of the building.

The second vibrating chute is available for a reference measurement without stressing of the granulated carbon black. Here, the corresponding downcomer tube leads directly into the hopper and to the measurement zone of the laser light scattering and subsequently likewise into the extraction line.

The APC value is the difference between the proportion of particles having a size of <125 μm in % by weight after pneumatic transport of the granulated carbon blacks and the proportion of particles having a size of <125 μm in % by weight in the unstressed granulated carbon blacks (without pneumatic transport).

Granulate size distribution: The volumetric cumulative distribution Q3 is determined using a commercial CAMSIZER instrument from Retsch GmbH in Haan, equipped with an area light source and two CCD cameras for recording the image and having a feed chute DR 100-45 and a hopper for introducing products. The granulate sizes with the cumulative distribution values 10% (=Q3:10%), 50% (Q3:50%) and 90% (=Q3:90%) are employed as characteristic parameters.

Proportion of nonspherical granules (NSP): The NSP value is determined using a commercial CAMSIZER instrument from Retsch GmbH in Haan. This calculates the sphericity (square of projected area:circumference) of each granulate measured optically. The NSP value characterizes the percentage of granules (by number) whose sphericity is less than 0.9 (sphere=1).

Total granulate hardness (mass strength): in accordance with ASTM D-1937-05

Bulk density: in accordance with D-1513-05.

Pressure filter test, 25 μm/5 μm: by a method based on DIN EN 13900-5 using a 25 μm sieve of the 4-layer filter disc type with finest layer=square 25 μm openings from GKD-Gebr. Kufferath or a 5 μm Porostar sieve from Haver & Boeker Flat film test: The flat film test has the aim of obtaining quantitative information on the carbon black distribution and redilution properties of carbon black/polymer concentrates. It is carried out by a method based on the draft standard DIN EN 13900-6 using an automatic film quality analysis system from OCS (Optical Control Systems) in Witten. The quantitative evaluation is carried out by means of electronic image analysis (winfs5 software from OCS) in transmitted light.

For this purpose, the carbon black/polymer concentrates to be tested are diluted with a suitable test polymer to a carbon black concentration of 1% by means of a single-screw extruder and processed to produce flat films. The flat films produced are evaluated quantitatively on-line by means of electronic image analysis in transmitted light.

In this test, 7.5 m² films are evaluated in each experiment. The reduction in the light transmission caused by carbon black agglomerates and contaminants is utilized by the camera system to detect these as defects.

To assess the film quality, defects above an area corresponding to the size of a circular cross section of 50 μm are determined and classified in 10 size classes. In addition, the total defect area of the film is calculated in ppm.

The number of defects found depends very substantially on the sensitivity/threshold value set in the software. Comparison of optical microscopy evaluations with the film analysis system has shown that a threshold value designated as level 35 gives comparable results. The threshold value of level 35 means that defects are only recognized as such when the light transmission is reduced below 35% of the previous value. Since the light transmission values of the film are subject to some fluctuations in width and length, the absolute threshold value is continually recalculated. The grey value, which regulates the illumination time of the film, is automatically adjusted. If the film becomes too dark during the measurement and the grey value set cannot be restored, the measurement is automatically ended. In the case of doubt, the measurement should then be repeated. The grey value was given a value of 170.

Dispersion hardness: in accordance with DIN EN 13900-2.

The advantage of the granulated carbon blacks of the invention (Examples 4-10) is that they are very stable on transport and at the same time can readily be dispersed. This is reflected in an APC value (transport velocity of 8 m/s, solids loading of 27 g per kg of air) of less than 20% by weight, while the APC value of the comparative examples (Examples 1-3) is greater than 25% by weight. The granulated carbon blacks of the invention also display significant advantages in respect of abrasion. In terms of the dispersing properties, characterized by the pressure filter value, the individual granulate hardness, the dispersion hardness and the total defect area in the flat film test, the granulated carbon blacks of the invention (Examples 4-10) display dispersing properties which are as good as those of the comparative examples (Examples 1-3). For example, the 25 μm pressure filter value is in all cases less than or equal to 2 bar cm²/g. The 5 μm pressure filter value for Examples 4-8 is less than or equal to 30 bar cm²/g.

These excellent granulate properties can be achieved even at comparatively high throughputs in the process of the invention, as comparison of Example 1 with Example 6 shows.

The invention claimed is:

1. Granulated carbon black, characterized in that said carbon black has an APC value, measured at a transport velocity of 8 m/s and a solids loading of 27 g/kg, that is less than or equal to 20% by weight and a 25 μm pressure filter value of less than 5 bar cm²/g.

2. The carbon black according to claim 1, wherein the carbon black is selected from the group consisting of a filler carbon black, a reinforcing filler carbon black, a UV stabilizer carbon black, a conductive carbon black, a pigment carbon black and a reducing agent carbon black.

3. The carbon black of claim 1 wherein the carbon black is binder free.

4. The carbon black of claim 1 wherein the carbon black comprises a binder.

5. The carbon black according to claim 1 wherein said APC value is less than or equal to 15% by weight.

6. The carbon black according to claim 1 wherein said APC value is less than or equal to 8% by weight.

7. The carbon black according to claim 1 wherein said APC value is 6 to 16% by weight.

8. The carbon black according to claim 1 wherein the 25 μm pressure filter value is 0.1 to 1.9 bar cm²/g.

9. The carbon black according to claim 8 wherein a 5 μm pressure filter value is 2 to 35 bar cm²/g.

10. The carbon black according to claim 9 wherein the 25 μm pressure filter value is 0.1 to 0.3 bar cm²/g.

11. The carbon black according to claim 1 wherein the 25 μm pressure filter value is 0.1 to 0.3 bar cm²/g.

12. The carbon black according to claim 1 having an average granulate diameter Q3:50% of 470 to 650.

13. Process for producing granulated carbon black according to claim 1, characterized in that carbon black powder is pregranulated in a first mixing granulator with addition of a granulating liquid with or without binder and granulated to completion in a second mixing granulator without further addition of granulating liquid and with a rotor speed of 450 to 1,000 rpm.

14. The process of claim 13 wherein the rotor speed in the second mixing granulator is 600 to 900 rpm.

15. The process of claim 13 wherein granulation in the first mixing granulator occurs with a rotor speed of 300 to 1,000 rpm.

16. The process of claim 15 wherein granulation in the first mixing granulator occurs with a rotor speed of 450 to 900 rpm.

17. A method of forming a material, comprising:
introducing the carbon black of claim 1, as a first ingredient, to a second ingredient to form the material.

18. The method according to claim 17 wherein the material formed is selected from the group consisting of rubber, plastic, printing inks, inks, inkjet inks, toners, surface coatings, paints, paper, bitumen, concrete building material and non-concrete building materials.

19. The method of claim 17 wherein the first ingredient being introduced is selected from the group consisting of a filler carbon black, a reinforcing filler carbon black, a UV stabilizer carbon black, a conductive carbon black, a pigment carbon black and a reducing agent carbon black.

20. The method of claim 17 wherein the second ingredient is a rubber polymer.

* * * * *